United States Patent [19]
Shea, Sr.

[11] Patent Number: 5,806,332
[45] Date of Patent: Sep. 15, 1998

[54] POWER GENERATING SYSTEM

[76] Inventor: Raymond E. Shea, Sr., 32 Juniper La., Holden, Mass. 01520

[21] Appl. No.: 728,019

[22] Filed: Oct. 9, 1996

[51] Int. Cl.[6] ................................................... F25B 27/02
[52] U.S. Cl. ............................... 62/323.3; 60/618; 62/243
[58] Field of Search .............................. 62/323.3, 323.1, 62/243, 239; 60/618, 597

[56] References Cited

U.S. PATENT DOCUMENTS

| | | |
|---|---|---|
| 2,169,664 | 8/1939 | Shifflett . |
| 2,869,332 | 1/1959 | Keller . |
| 2,919,540 | 1/1960 | Percival . |
| 3,094,850 | 6/1963 | Newton .............................. 62/323.3 X |
| 3,475,919 | 11/1969 | Ellis . |
| 3,487,655 | 1/1970 | Dennis et al. . |
| 3,554,849 | 1/1971 | Wagner . |
| 4,433,548 | 2/1984 | Hallstrom, Jr. ....................... 60/618 X |
| 4,996,845 | 3/1991 | Kim . |
| 5,199,274 | 4/1993 | Yoshida et al. ..................... 62/323.3 X |

FOREIGN PATENT DOCUMENTS

| | | |
|---|---|---|
| 2750-549 | 5/1979 | Germany . |
| 56-156407 | 12/1981 | Japan . |
| 57-44712 | 3/1982 | Japan . |
| 62-244712 | 10/1987 | Japan . |
| 2196759 | 5/1988 | United Kingdom .................. 62/323.3 |

*Primary Examiner*—Harry B. Tanner
*Attorney, Agent, or Firm*—John E. Toupal; Harold G. Jarcho

[57] ABSTRACT

An electric power generating system including a motor vehicle defining a passenger compartment and an engine compartment; an internal combustion engine retained in the engine; an exhaust system defining a passage for discharging exhaust gases produced by the internal combustion engine; and a primary heat exchange system coupled to the exhaust system means and defining a primary chamber adapted to transfer thermal energy from the exhaust gases to a working fluid; a cooling system for circulating cooling liquid in a path that results in removal of thermal energy from the internal combustion engine; and an auxiliary heat exchange system coupled to the cooling system and defining an auxiliary chamber adapted to transfer thermal energy from the cooling fluid to the working fluid. Also included are an expander having a rotor driven by expansion of the working fluid; working fluid tubulation for circulating the working fluid through the primary chamber, the auxiliary chamber and the expander; an electrical generator coupled to the rotor so as to be driven thereby; and electrical energy storage means connected to receive electrical energy from the electrical generator. The primary and auxiliary heat exchanger systems recover from the engine's exhaust and cooling systems unused energy which is converted into electrical energy by the expander to improve fuel efficiency.

10 Claims, 2 Drawing Sheets

POWER GENERATING SYSTEM

BACKGROUND OF THE INVENTION

This invention relates generally to a power generating system and, more particularly, to a power system for generating power from the heat by-products of an internal combustion engine.

The internal combustion engines used to drive most vehicles are relatively inefficient. A substantial portion of the energy initially present in consumed fuel is wasted in the form of generated hot exhaust gases and engine heat. Because of this inefficiency, various systems have been proposed for reclaiming the energy present in hot exhaust gases. Systems of that type are disclosed, for example, in U.S. Pat. Nos. 4,097,752; 4,694,653; 4,694,654 and 4,864,151. These prior systems have suffered, however, from a number of individual and collective deficiencies including inefficiency, high cost, and cumbersome spacial requirements.

The object of this invention, therefore, is to provide an improved power generating system for use with internal combustion engines.

SUMMARY OF THE INVENTION

The invention is an electric power generating system including a motor vehicle defining a passenger compartment and an engine compartment; an internal combustion engine retained in the engine compartment; an exhaust system defining a passage for discharging exhaust gases produced by the internal combustion engine; and a primary heat exchange system coupled to the exhaust system means and defining a primary chamber adapted to transfer thermal energy from the exhaust gases to a working fluid; a cooling system for circulating cooling liquid in a path that results in removal of thermal energy from the internal combustion engine; and an auxiliary heat exchange system coupled to the cooling system and defining an auxiliary chamber adapted to transfer thermal energy from the cooling liquid to the working fluid. Also included are an expander having a rotor driven by expansion of the working fluid; working fluid tubulation for circulating the working fluid through the primary chamber, the auxiliary chamber and the expander; an electrical generator coupled to the rotor so as to be driven thereby; and electrical energy storage means connected to receive electrical energy from the electrical generator. The primary and auxiliary heat exchanger systems recover from the engine's exhaust and cooling systems unused energy which is converted into electrical energy by the expander to improve fuel efficiency.

According to certain features of the invention, the cooling system comprises a radiator, a liquid pump for producing circulation of the cooling liquid, and a liquid pipe for directing a first portion of the cooling liquid between the internal combustion engine and the auxiliary heat exchange system and a second portion of the cooling liquid between the internal combustion engine and the radiator means. The cooling liquid is used both to cool the engine and to transfer energy to the expander.

According to other features, the invention includes a primary air-cooled radiator for receiving the cooling liquid through the liquid pipe, an auxiliary air-cooled radiator; a fluid pipe connected to the tubulation for circulating the working fluid between the auxiliary air-cooled radiator and the auxiliary heat exchange system, and a fluid pump for producing circulation of the working fluid. The auxiliary air-cooled radiator provides an additional energy source for the expander.

According to yet another feature, the invention includes an air conditioner for producing cooling air flow into the passenger compartment, and energized by the electric generator. Air conditioning comfort is provided by the energy recovered by the system.

According to still other features of the invention, the vehicle further defines a trunk storage compartment and includes a chassis, the air conditioner and electrical energy storage means are disposed in the trunk storage compartment, and the expander and electrical generator are mounted under the chassis. This arrangement prevents overcrowding of the engine compartment.

According to further features of the invention, the primary heat exchange system comprises a muffler and a catalytic converter, the primary chamber comprises a muffler chamber defined by the muffler and a converter chamber defined by the catalytic converter, and the tubulation circulates the working fluid through the muffler chamber and the converter chamber. This combination recovers heat energy present in both a muffler and a catalytic converter.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 2:
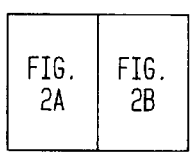
FIGS. 2, 2a and 2b are schematic diagrams of the power generating system employed by the vehicle of FIG. 1.
Figure 2A:
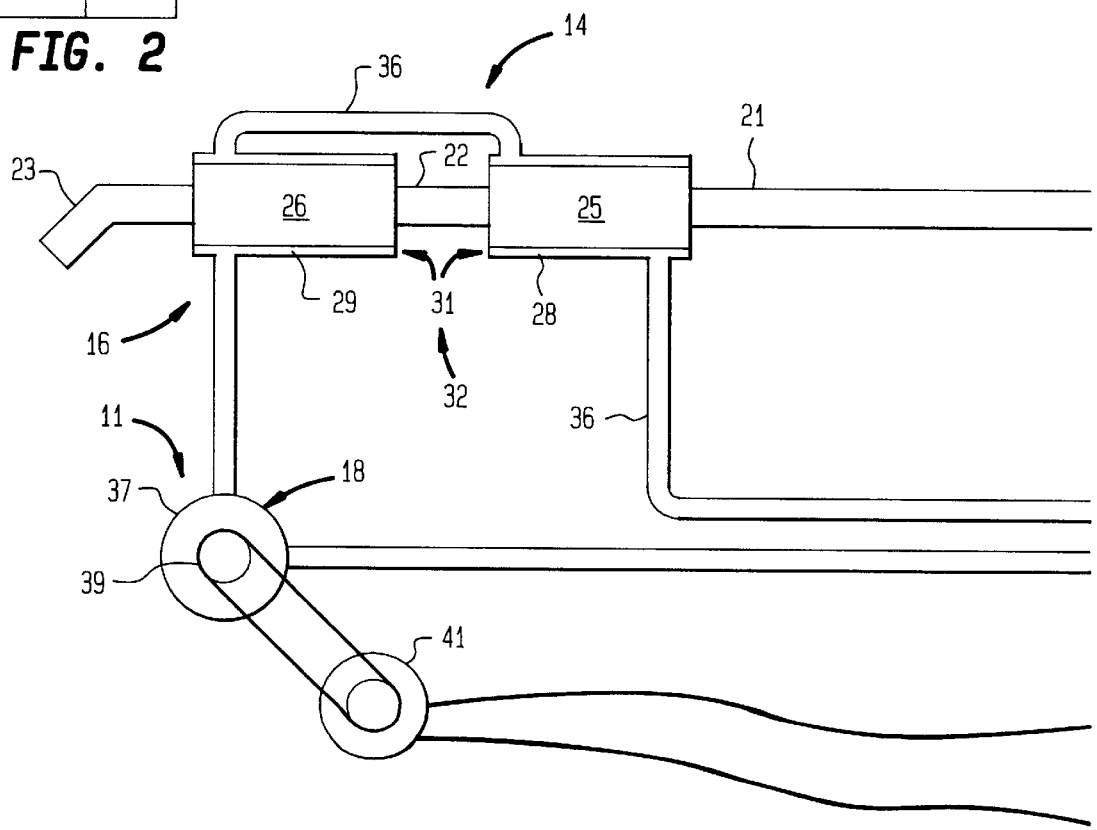
Figure 1:
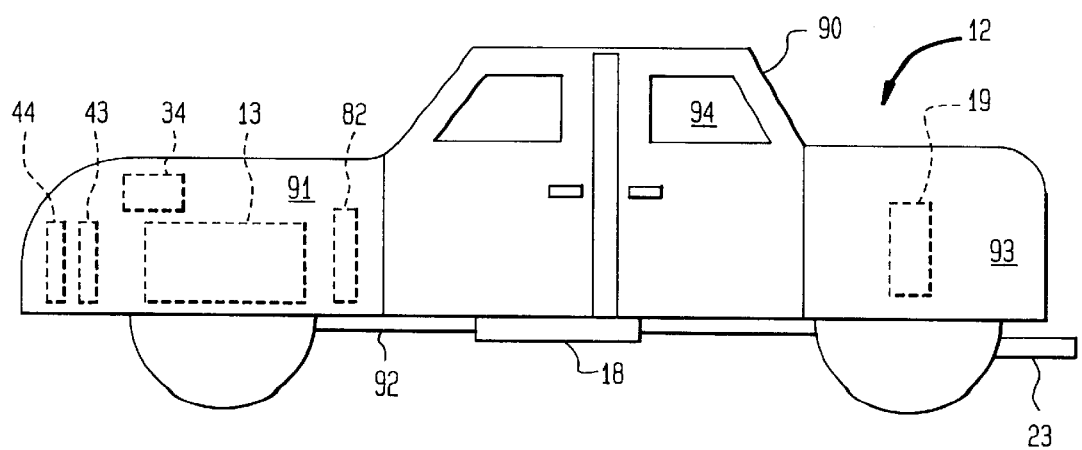
FIG. 1 is a schematic illustration of an automative vehicle having a power generating system according to the invention.
Figure 2B:
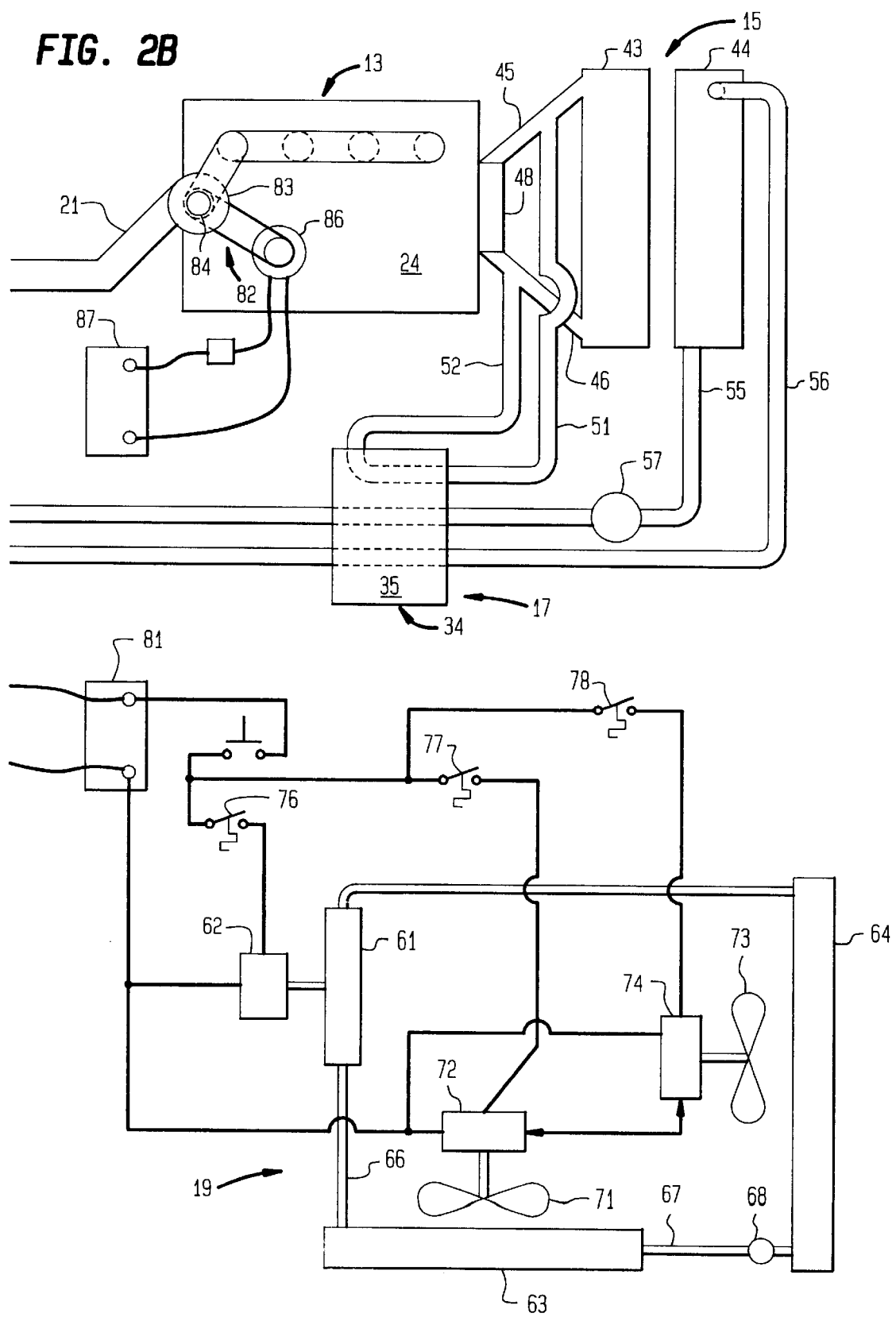

A power generating system 11 for increasing the operating efficiency of an automobile 12 is illustrated in FIGS. 1 and 2. The power generating system 11 includes a conventional internal combustion engine system 13, an exhaust system 14 and an engine cooling system 15. Also included in the power generating system 11 is a primary energy conversion system 16 associated with the exhaust system 14, an auxiliary energy conversion system 17 associated with the cooling system 15 and an electrical energy generation system 18. Powered by the electrical energy system 18 is an air conditioner system 19.

The exhaust system 14 includes a series of interconnected exhaust pipes 21–23 communicating with an exhaust manifold of an internal combustion engine 24 in the engine system 13. Connected between the exhaust pipes 21 and 22 is a muffler 25 while a catalytic converter 26 is connected between the exhaust pipes 22 and 23. A muffler chamber 28 surrounds and is in intimate heat exchanging contact with the muffler 25 so as to receive heat from discharged exhaust gases. Similarly, a converter chamber 29 surrounds and is in intimate heat exchanging contact with the catalytic converter 26 so as to receive heat from discharged exhaust gases. Together the muffler chamber 28 and the converter chamber 29 form composite primary chamber 31 that functions as a primary heat exchanger 32.

The auxiliary energy conversion system 17 includes an auxiliary heat exchanger 34 that defines an auxiliary chamber 35. A working fluid tubulation 36 is connected between the muffler chamber 28, the converter chamber 29, the auxiliary chamber 35 and an expansion chamber of an expander unit 37 included in the electrical energy generation system 18. Preferably, the expander unit 37 is the type disclosed in U.S. Pat. No. 4,738,111. Coupled to a rotor 39 of the expander unit 37 is an electrical generator 41.

The cooling system 15 includes a primary air-cooled radiator 43 and an auxiliary air-cooled radiator 44. Connected between the primary radiator 43 and the engine 24 are liquid pipes 45, 46 that pass cooling water circulated by a liquid pump 48. Bypass liquid pipes 51, 52 are connected for liquid communication between the pipes 45, 46 and the auxiliary heat exchanger 34. The pipes 51, 52 divert to the auxiliary heat exchanger 34 a portion of the water circulated by the water pump 48. Connected between the auxiliary radiator 44 and the auxiliary heat exchanger 34 are fluid pipes 55, 56 connected to the tubulation 36 so as to pass working fluid circulated by a fluid pump 57.

The air conditioning system 19 includes a compressor 61 driven by an electric motor 62, a condenser 63 and an evaporator 64. Connecting the compressor 61 and the evaporator 64 is a refrigerant pipe 65 while another refrigerant pipe 66 connects the compressor 61 with the condenser 63. The evaporator 64 is connected also with the condenser 63 by a refrigerant pipe 67 and an expansion valve 68. Associated with the condenser 63 is a fan 71 driven by an electric motor 72 while a fan 73 associated with the evaporator 64 is driven by an electric motor 74. The electric motors 62, 72 and 73 are connected in parallel to the output of the electric generator 41 by, respectively, electrical switches 76, 77 and 78. Also connected in parallel with the output of the electric generator 41 is an electrical energy storage battery 81.

An additional electrical energy generation system 82 is associated with the exhaust system 14. Operatively disposed within the exhaust pipe 21 is an exhaust turbine 83. A rotor 84 of the turbine 83 is driven by exhaust gases in the pipe 21 and is operatively coupled to an additional electrical generator 86. Connected to the output of the additional generator 86 is an additional energy storage battery 87.

As shown in FIG. 1, the engine system 13 is disposed within an engine compartment 91 defined by a body portion 90 of the vehicle 12. Also retained by the engine compartment 91 are the auxiliary heat exchanger 34, the additional electrical generator system 82 and the primary and auxiliary radiators 43, 44 with the primary radiator 43 positioned behind the auxiliary generator radiator 44. The electrical energy generation system 18 including the expander 37 and the generator 41 are mounted below a chassis 92 of the vehicle 12. Retained within a trunk storage compartment 93 defined by the body portion 90 is the air conditioning system 19. Cooled air generated by the air conditioning system 19 is transported by ducts (not shown) into a passenger compartment 94 also defined by the body portion 90.

OPERATION

A working fluid circulating in the working fluid tubulation 36 is heated in the primary heat exchange system 32 and then expanded in the expander 37 to produce rotation of the rotor 39 and the coupled electrical generator 41. Additional heat energy is received by the working fluid in the auxiliary heat exchanger 34 which removes heat from the cooling water circulating through the pipes 51, 52 and from the working fluid circulating through the fluid pipes 55, 56. The electrical power produced by the generator 41 is used to operate the air conditioning system 19 when the air conditioning system 19 is not operating, electrical energy from the generator 41 is stored by the battery 81 which then can supplement operation of the air conditioner system 19 or other electrically energized devices. Additional electrical energy generated by the generator 86 in the engine compartment 91 is applied to the storage battery 87 and can be used to energize other electrical components of the vehicle 12.

Obviously, many modifications and variations of the present invention are possible in light of the above teachings. It is to be understood, therefore, that the invention can be practiced otherwise than as specifically described.

What is claimed is:

1. An electric power generating system comprising:

motor vehicle means defining a trunk storage compartment, passenger compartment and an engine compartment and including a chassis;

an internal combustion engine retained in said engine compartment;

exhaust means defining a passage for discharging exhaust gases produced by said internal combustion engine;

primary heat exchange means comprising a muffler and a catalytic converter, and coupled to said exhaust means, said primary heat exchange means including primary chamber means, a muffler chamber defined by said muffler and a converter chamber defined by said catalytic converter, said primary heat exchange means adapted to transfer thermal energy from the exhaust gases to a working fluid in said primary chamber means;

cooling system means for circulating cooling liquid in a path that results in removal of thermal energy from said internal combustion engine;

auxiliary heat exchange means coupled to said cooling system means and defining auxiliary chamber means, said auxiliary heat exchange means adapted to transfer thermal energy from the cooling fluid to a working fluid in said auxiliary chamber means;

expander means mounted under said chassis and having rotor means adapted to be driven by expansion of a circulatory working fluid;

working fluid tubulation means for circulating a working fluid through said primary chamber means, said auxiliary chamber means and said expander means;

electrical generator means mounted under said chassis and coupled to said rotor means so as to be driven thereby;

air conditioner means disposed in said trunk storage compartment and adapted to produce cooling air flow into said passenger compartment, said air conditioner means comprising electric motor means connected to be energized by said electric generator means; and electrical energy storage means connected to receive electrical energy from said electrical generator means.

2. A system according to claim 1 wherein said cooling system means comprises radiator means, liquid pump means for producing circulation of the cooling liquid, and liquid pipe means for directing a first portion of the cooling liquid between said internal combustion engine and said auxiliary heat exchange means and a second portion of the cooling liquid between said internal combustion engine and said radiator means.

3. A system according to claim 2 wherein said radiator means comprises a primary air-cooled radiator for receiving said cooling liquid and an auxiliary air-cooled radiator; and fluid pipe means connected to said tubulation means for circulating said working fluid between said auxiliary air-cooled radiator and said auxiliary heat exchange means, and fluid pump means for producing circulation of said working fluid.

4. A system according to claim 3 wherein said primary air-cooled radiator is disposed behind said auxiliary air-cooled radiator in said engine compartment.

5. A system according to claim 1 wherein said electric motor means and said electrical energy storage means are connected in parallel to said electrical generator means.

6. A system according to claim 1 wherein said cooling system means comprises radiator means, liquid pump means for producing circulation of the cooling liquid, and liquid pipe means for directing a first portion of the cooling liquid between said internal combustion engine and said auxiliary heat exchange means and a second portion of the cooling liquid between said internal combustion engine and said radiator means.

7. A system according to claim 6 wherein said radiator means comprises a primary air-cooled radiator for receiving said cooling liquid and an auxiliary air-cooled radiator; and fluid pipe means connected to said tubulation means for circulating said working fluid between said auxiliary air-cooled radiator and said auxiliary heat exchange means, and fluid pump means for producing circulation of said working fluid.

8. A system according to claim 1 including turbine means disposed in said passage so as to be driven by the exhaust gases, and an additional electrical generator coupled to be driven by said turbine means.

9. A system according to claim 8 wherein said cooling system means comprises radiator means, liquid pump means for producing circulation of the cooling liquid, and liquid pipe means for directing a first portion of the cooling liquid between said internal combustion engine and said auxiliary heat exchange means and a second portion of the cooling liquid between said internal combustion engine and said radiator means.

10. A system according to claim 9 wherein said radiator means comprises a primary air-cooled radiator for receiving said cooling liquid and an auxiliary air-cooled radiator; and fluid pipe means connected to said tubulation means for circulating said working fluid between said auxiliary air-cooled radiator and said auxiliary heat exchange means, and fluid pump means for producing circulation of said working fluid.

* * * * *